(12) United States Patent
Noumi et al.

(10) Patent No.: US 7,876,122 B2
(45) Date of Patent: Jan. 25, 2011

(54) DISPLAY DEVICE

(75) Inventors: Shigeaki Noumi, Tokyo (JP); Yuichi Masutani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 125 days.

(21) Appl. No.: 12/411,990

(22) Filed: Mar. 26, 2009

(65) Prior Publication Data
US 2009/0243641 A1    Oct. 1, 2009

(30) Foreign Application Priority Data
Mar. 27, 2008    (JP) .............................. 2008-083311

(51) Int. Cl.
*G01R 31/00*    (2006.01)
(52) U.S. Cl. ...................... 324/770; 349/151
(58) Field of Classification Search .................. None
See application file for complete search history.

(56) References Cited

U.S. PATENT DOCUMENTS 7,323,720 B2 *    1/2008    Kubota et al. ................. 257/84
7,518,690 B2 *    4/2009    Komaju ....................... 349/151
2005/0286005 A1    12/2005    Watanabe et al.
2006/0175713 A1    8/2006    Aramatsu

FOREIGN PATENT DOCUMENTS

| JP | 2006-10898 | 1/2006 |
| JP | 2006-72032 | 3/2006 |
| JP | 2006-215302 | 8/2006 |

* cited by examiner

*Primary Examiner*—Ha Tran T Nguyen
*Assistant Examiner*—Arleen M Vazquez
(74) *Attorney, Agent, or Firm*—Oblon, Spivak, McClelland, Maier & Neustadt, L.L.P.

(57) ABSTRACT

An array substrate is provided with thereon a display area in which plural pixels are arranged in a matrix shape. Output-side mounting terminals for a source driving circuit chip, which is COG-mounted on a frame area on the outside of the display area, have a plural-row zigzag arrangement. Inspection terminals individually provided in correspondence to the output-side mounting terminals have a zigzag arrangement opposite to the zigzag arrangement of the output-side mounting terminals in a terminal-row direction. Additionally, the output-side mounting terminals and the inspection terminals are disposed below the source driving circuit chip.

6 Claims, 4 Drawing Sheets

P1=2 (L1+L2+Y1)+Y2

P0=2 (L1+L2+Y1)+Y1

DISPLAY DEVICE

This application claims priority from Japanese Patent Application No. 2008-083311 filed on Mar. 27, 2008, the entire subject matter of which is incorporated herein by reference.

BACKGROUND OF THE INVENTION

1. Field of the Invention

The present invention relates to a display device, and more particularly, to a configuration of mounting terminals and inspection terminals of a display device in which a driving circuit chip for driving pixels forming a display area is directly mounted onto an array substrate.

2. Description of the Related Art

In recent years, a display device has been used as information display means for an observer in various apparatuses. Currently, instead of a Braun tube which has been mainly used so far, a new thin-type display device has been introduced which uses liquid crystal, plasma, EL (Electro Luminescence), or FED (Field Emission Display). In particular, since a small-sized model or a large-sized model can be manufactured in a liquid crystal display device, the liquid crystal display device is currently used as a typical thin-type display device.

In this kind of thin-type display device, plural pixels are arranged in a matrix shape to thereby form a display area. Additionally, in a frame area on the outside of the display area, a substrate is provided with mounting terminals which are connected to a driving circuit at the ends of wirings used for driving the pixels.

Among middle-sized or small-sized display devices, in a model which further requires a decrease in thickness and a decrease in manufacture cost or a model which requires vibration resistance for a vehicle or the like, a COG (Chip On Glass) mounting operation is widely used in which a driving circuit chip (driver IC) used for driving pixels in the display area is directly mounted to the mounting terminals formed on the substrate. Protrusion-shaped bump electrodes are respectively provided on the input side and the output side of the driving circuit chip, and the mounting terminals are arranged in correspondence to the positions thereof.

In a small-sized model such as a cellular phone or a digital camera, a high definition has been advanced, and a wiring pitch of the pixels considerably becomes small, that is, 40 micron or less. When the pitch becomes narrow, a position deviation occurs between the mounting terminals of the substrate and the bump electrodes of the driving circuit chip, thereby causing a problem of a difficult electric connection. Thus, in order to ensure a yield of the COG-mounting operation, the output-side bump electrodes and the output-side mounting terminals of the driving circuit chip have a two-row or more zigzag arrangement instead of a one-row arrangement, thereby increasing the pitch between the output-side bump electrode and the mounting terminal in each row by two times or more (for example, see JP-A-2006-10898 (FIGS. 1, 5, 7, and 9) and JP-A-2006-72032 (FIG. 5)).

Generally, in a manufacture process of the display device, a display inspection is carried out before the COG-mounting operation of the driving circuit chip in many cases. For this reason, an inspection terminal is separately provided in some cases in addition to the mounting terminals for the COG-mounting operation (for example, see JP-A-2006-10898 and JP-A-2006-72032).

As the display inspection, there are known a simple display inspection in which a common inspection terminal is provided for each terminal of colors, red, green, and blue so as to display only a simple screen and a precise display inspection in which inspection terminals are individually provided in correspondence to all output-side mounting terminals of a driving circuit chip and an inspection needle (probe) contacts with all inspection terminals so as to perform an arbitrary display.

In the former simple display inspection, several number of inspection terminals may be provided, but a precise inspection cannot be carried out. In addition, in the case where a defective state occurs due to static electricity upon cutting each wiring and the common inspection terminal for each color so as to be separated after the display inspection or in the case where each wiring and the common inspection terminal are configured to be in an OFF state via a TFT (Thin Film Transistor) switch during a time other than the display inspection, a problem may arise in that a yield is reduced when a defective state occurs in the TFT switch.

In the latter precise display inspection, the inspection terminals are individually arranged in zigzag in the same direction as the terminal-row direction at a position on the wirings connected to the mounting terminals arranged in zigzag in the frame area or a position where the wiring is further extended from each mounting terminal. The inspection terminal is different depending on positioning precision of an inspection device or a type of an inspection needle, but in general, the inspection terminal larger than the mounting terminal for the COG-mounting operation is required in many cases.

In recent years, since a frame width of the display device becomes narrow in order to ensure a maximum display area while maintaining the same external dimension of the display device, an allowance of an area (width) other than the COG-mounting area becomes small. Additionally, in order to cope with the narrow frame width, a width of the driving circuit chip becomes narrow.

From the viewpoint of a decrease in cost of the driving circuit chip, in order to increase the number of driving circuit chips obtained from one sheet of Si-substrate, a width of the driving circuit chip becomes narrow.

In the display device where the driving circuit chip is COG-mounted, in the case where the inspection terminals are individually provided in correspondence to the output-side mounting terminals of the driving circuit chip, the inspection terminal is disposed between the display area and the driving circuit chip in the liquid crystal display device disclosed in JP-A-2006-10898 and JP-A-2006-72032. For this reason, it is necessary to ensure an additional area used to form the inspection terminal in the frame area.

In addition, in order to prevent corrosion of the terminals, a protective resin is applied to an area where the terminals are exposed, but when the area having the exposed terminals increases, a problem arises in that a usage amount of the protective resin increases.

SUMMARY OF THE INVENTION

The present invention is contrived to solve the above-described problems, and an object of the invention is to provide a display device coping with a high definition, a narrow frame width, and a protective resin saving and having excellent reliability by minimizing a frame-width-direction length of a terminal area obtained by adding the output-side mounting terminals to the inspection terminals even in the case where the inspection terminals are individually provided in correspondence to the output-side mounting terminals of the driving circuit chip.

According to an aspect of the invention, there is disclosed a display device including: a substrate provided with a display area which has plural pixels arranged in a matrix shape and mounting terminals which are provided in a frame area on the outside of the display area so as to be connected to wirings for driving the pixels; and a driving circuit chip directly mounted to the mounting terminals on the substrate so as to drive the pixels, wherein the mounting terminals on the output side of the driving circuit chip have plural-row zigzag arrangement, wherein inspection terminals disposed to respectively correspond to the mounting terminals have a zigzag arrangement opposite to the zigzag arrangement of the mounting terminals in a row direction of the mounting terminals, and wherein the mounting terminals and the inspection terminals are disposed below the driving circuit chip.

According to the invention, since it is possible to carry out the display inspection capable of performing an arbitrary display before the COG-mounting operation, it is possible to obtain the display device coping with the high definition and the narrow frame width and having excellent reliability.

DETAILED DESCRIPTION OF THE PREFERRED EMBODIMENTS

Figure 1:
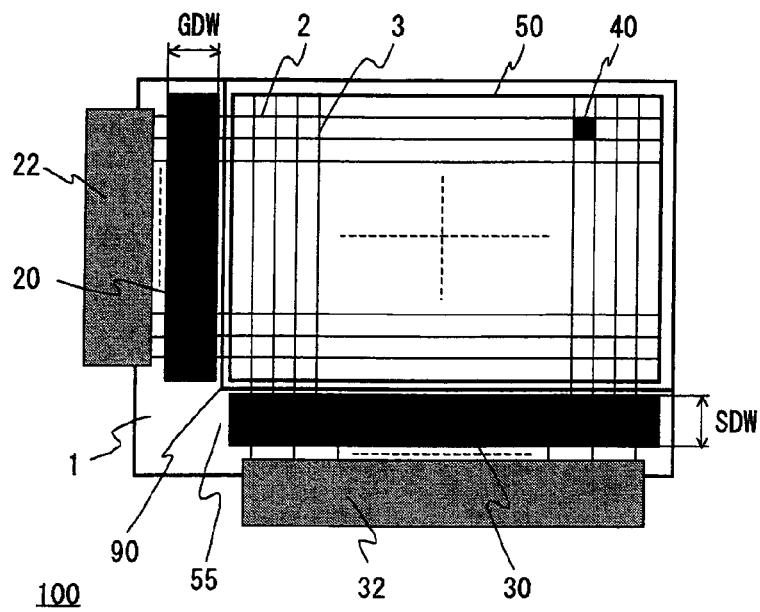
FIG. 1 is a top view showing a schematic configuration of a display device according to a first embodiment of the invention.

Hereinafter, a display device according to the invention will be described with reference to the accompanying drawings. Additionally, in the respective drawings used to describe the following embodiments, since the same reference numerals indicate the same components or the corresponding components, the repetitive description thereof will be appropriately omitted.

First Embodiment

FIG. 1 is a top view showing a schematic configuration of a display device according to a first embodiment of the invention.

The display device shown in FIG. 1 is a liquid crystal display device 100. An array substrate 1 formed of transparent insulating material such as glass has thereon a display area 50 in which plural pixels 40 are arranged in a matrix shape. Each pixel 40 is formed in an area surrounded by gate wirings 2 and source wirings 3 and is formed by a TFT switch, a pixel electrode, a holding capacity, and the like (which are not shown in the drawing). Additionally, in a frame area 55 on the outside of the display area 50, the gate wirings 2 and the source wirings 3 used to drive the pixels 40 are drawn out and connected to a gate driving circuit chip 20 and a source driving circuit chip 30.

The gate driving circuit chip 20 and the source driving circuit chip 30 are directly COG-mounted on the array substrate 1. The output sides of the gate driving circuit chip 20 and the source driving circuit chip 30 are connected to the gate wirings 2, the source wirings 3, and the like.

For the connection to an external circuit (not shown) used to supply an image signal, a clock signal, a power, and the like, flexible substrates 22 and 32 electrically connected to the input sides of the gate driving circuit chip 20 and the source driving circuit chip 30 are mounted onto the array substrate 1.

The liquid crystal display device 100 is formed in such a manner that the array substrate 1 is attached to an opposed substrate 90 having a color filter and the like formed thereon by means of a spacer formed of a resin and liquid crystals are filled in a gap therebetween. The liquid crystals are sealed by a sealing material provided in the periphery of the display area 50. Then, polarizing pieces are attached onto the surfaces of the array substrate 1 and the opposed substrate 90. In a transmitting type, a backlight unit is disposed on the rear surface thereof (not shown).

In general, in a manufacture process of the liquid crystal display device 100, a display inspection is carried out before the COG-mounting operations of the gate driving circuit chip 20 and the source driving circuit chip 30, and then the COG-mounting operation of only the non-defective product is carried out. Accordingly, it is possible to prevent a case in which the COG-mounting operation of the defective product is uselessly carried out.

Additionally, the flexible substrates 22 and 32 are mounted to the non-defective product. In the COG-mounting operation, an anisotropic conductive film, which is an adhesive tape obtained by dispersing conductive particles, is used to connect bump electrodes to mounting terminals of the gate driving circuit chip 20 and the source driving circuit chip 30. In the mounting operation of the flexible substrates 22 and 32, an anisotropic conductive film having a different specification is used.

As described in "Background Art", it is desirable that a width GDW of the gate driving circuit chip 20 and a width SDW of the source driving circuit chip 30 are small in order to cope with a narrow frame width.

Figure 2:
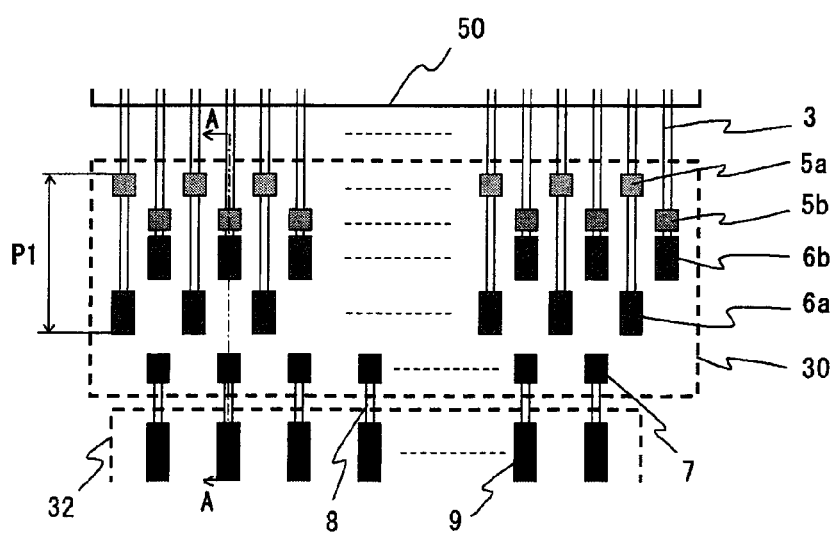
FIG. 2 is a top view magnifying an area of a source driving circuit chip of the display device according to the first embodiment of the invention.
Figure 3:
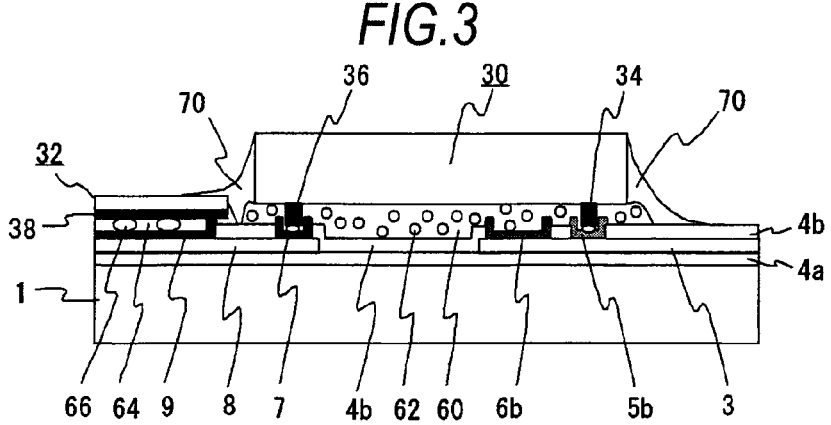
FIG. 3 is a sectional view taken along the line A-A of FIG. 2.

Next, the terminal configuration on the side of the source driving circuit chip 30 will be described in detail with reference to FIGS. 2 and 3. FIG. 2 is a top view magnifying a mounting area of the source driving circuit chip 30 of the display device 100 shown in FIG. 1. For the easy understanding of the terminal configuration, only the external shapes of the source driving circuit chip 30 and the flexible substrate 32 are depicted by the dotted lines. Additionally, FIG. 3 is a sectional view taken along the line A-A of FIG. 2.

Output-side bump electrodes 34 of the source driving circuit chip 30 have a two-row zigzag arrangement. In correspondence to the positions, output-side mounting terminals 5a and 5b of the source driving circuit chip 30 formed on the array substrate 1 have a two-row zigzag arrangement. Since the output-side mounting terminals 5a and 5b can be arranged so as to have a pitch two times larger than that of the one-row arrangement, it is possible to cope with the high definition.

On the other hand, since the number of terminals of the input-side bump electrodes 36 of the source driving circuit chip 30 is small, the bump electrodes 36 have a one-row arrangement. In correspondence to the positions, input-side mounting terminals 7 of the source driving circuit chip 30 formed on the array substrate 1 have a one-row arrangement.

Mounting terminals 9 for the flexible substrate 32 formed on the array substrate 1 are respectively connected to the input-side mounting terminals 7 of the source driving circuit chip 30 by means of connection wirings 8. Also, the mounting terminals 9 for the flexible substrate 32 have a one-row arrangement. The flexible substrate 32 is provided with wiring flexible substrate terminals 38 connected to an external circuit so as to correspond to the flexible-substrate mounting terminals 9.

The source wirings 3 further extend from the output-side mounting terminals 5a and 5b of the source driving circuit chip 30 so as to be individually connected to inspection terminals 6a and 6b. Here, although the inspection terminals 6a and 6b have a two-row zigzag arrangement, it is characterized in that the zigzag arrangement is opposite to the two-row zigzag arrangement of the output-side mounting terminals 5a and 5b in the terminal-row direction. With the configuration of the zigzag arrangements in the opposite direction, a gap between each inspection terminal 6b and each output-side mounting terminal 5b of each source wiring 3 belonging to odd or even number of one-side rows considerably becomes smaller than a gap between each inspection terminal 6a and each output-side mounting terminal 5a of each source wiring 3 belonging to the other-side row adjacent to the one-side row.

A length of the terminal area, formed by the output-side mounting terminals 5a and 5b and the inspection terminals 6a and 6b, in a direction of the source wiring 3 is indicated by "P1".

Since the inspection terminals 6a and 6b are disposed below the source driving circuit chip 30, it is not necessary to separately form the areas of the inspection terminals 6a and 6b in the frame area 55 except for the source driving circuit chip 30. Also, since an area below the source driving circuit chip 30 can be efficiently used, it is possible to suppress an increase in width of the frame area 55.

However, since the inspection terminals 6a and 6b are covered by the source driving circuit chip 30 after the COG-mounting operation, basically the inspection operation using the inspection terminals 6a and 6b cannot be carried out.

In addition, in the liquid crystal display device 100 after the COG-mounting operation, the output-side mounting terminals 5a and 5b, the inspection terminals 6a and 6b, and the input-side mounting terminals 7 are disposed below the COG-mounted source driving circuit chip 30. In general, since the source driving circuit chip 30 is configured as a Si-substrate, the source driving circuit chip 30 serves as a terminal protection plate for preventing an entry of humidity.

This advantage will be described further with reference to FIG. 3 corresponding to the sectional view taken along the line A-A of FIG. 2. The output-side bump electrodes 34 and the input-side bump electrodes 36 of the source driving circuit chip 30 are connected to the output-side mounting terminals 5b and the input-side mounting terminals 7 by means of conductive particles 62 dispersed in an anisotropic conductive film 60. Also, the output-side mounting terminals 5a not existing in the sectional position taken along the line A-A are connected to the output-side bump electrodes 34 of the source driving circuit chip 30.

The bump electrode is not provided at a position of the source driving circuit chip 30 corresponding to a position of the inspection terminal 6b. Even when the inspection terminal 6b is electrically connected to the output-side bump electrode 34 connected to the output-side mounting terminal 5b by means of the conductive particles 62, no problem arises because the same signal is obtained in the same wiring. In addition, the bump electrode is not provided at a position of the source driving circuit chip 30 corresponding to a position of the inspection terminal 6a not existing in the sectional position taken along the line A-A.

Here, the output-side mounting terminals 5a and 5b, the inspection terminals 6a and 6b, the input-side mounting terminals 7, and the flexible-substrate mounting terminals 9 have surfaces formed by a conductive film such as an ITO (Indium Tin Oxide) in which corrosion hardly occurs, and are connected to the source wirings 3 and the connection wirings 8 formed on the same layer as that of the source wirings 3 via a contact hole formed in insulating films of a protective film 4b and a gate insulating film 4a formed by nitride film or the like.

Although the output-side mounting terminals 5a and 5b, the inspection terminals 6a and 6b, the input-side mounting terminals 7, and the flexible-substrate mounting terminals 9 are connected to the same layer as that of the source wirings 3, the drawn-out wires of the source wires 3 may be formed in an interconnection layer formed in the same layer as that of the gate wirings 2 at the frame area 55 so as to be connected to the respective terminals.

The output-side mounting terminals 5a and 5b, the inspection terminals 6a and 6b, and the input-side mounting terminals 7 are covered by the source driving circuit chip 30 after the COG-mounting operation. In addition, the gap thereof is filled with the anisotropic conductive film 60. Since a protective resin 70 is applied to the periphery of the source driving circuit chip 30, humidity hardly enters into the output-side mounting terminals 5a and 5b, the inspection terminals 6a and 6b, and the input-side mounting terminals 7 disposed below the source driving circuit chip 30. Accordingly, corrosion hardly occurs in the terminals.

The protective resin 70 is applied to the periphery of the source driving circuit chip 30 so as to protect a gap between the array substrate 1 and the source driving circuit chip. As compared with the arrangement in which the inspection terminals 6a and 6b are exposed to the outside of the source driving circuit chip 30, it is possible to reduce an amount of the protective film 70 used at the positions of the inspection terminals 6a and 6b.

In addition, the mounting operation of the flexible substrate 32 is carried out in the same manner, and the flexible-substrate mounting terminals 9 are connected to the flexible substrate terminals 38 by means of conductive particles 66 dispersed in an anisotropic conductive film 64. Since the protective resin 70 is applied to the end of the flexible substrate 32, corrosion hardly occurs in the flexible-substrate mounting terminals 9 and the flexible substrate terminals 38.

As described above, since the output-side mounting terminals 5a and 5b, the inspection terminals 6a and 6b, and the input-side mounting terminals 7 are disposed below the source driving circuit chip 30, corrosion hardly occurs in the terminals, thereby improving the reliability of the liquid crystal display device 100.

Next, the advantage obtained by the zigzag arrangement of the output-side mounting terminals 5a and 5b and the opposite zigzag arrangement of the inspection terminals 6a and 6b in the terminal-row direction in the first embodiment will be described with reference to FIGS. 4 and 5.

Figure 4:
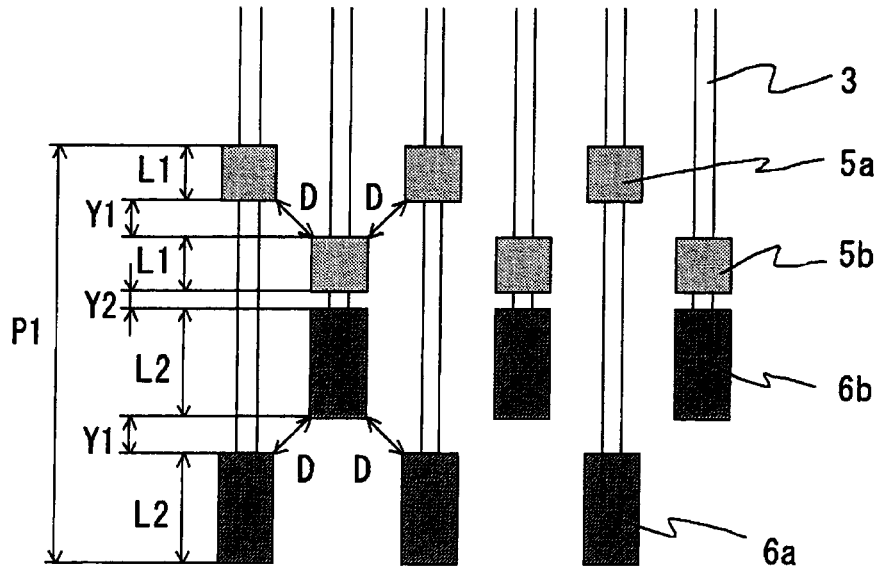
FIG. 4 is a top view further magnifying an output-side mounting terminal and an inspection terminal according to the first embodiment of the invention.

FIG. 4 is a top view further magnifying the areas of the output-side mounting terminals 5a and 5b and the inspection terminals 6a and 6b shown in FIG. 2. Here, a length of the output-side mounting terminals 5a and 5b in a direction of the source wiring 3 is indicated by "L1". Additionally, a length of the inspection terminals 6a and 6b in a direction of the source wiring 3 is indicated by "L2".

In a design of the array substrate 1, a minimum gap exists between different patterns. For example, it depends on etching precision or resolution of an exposure device in the manufacture process. Here, a minimum gap D is specified as a minimum gap in which a short-circuit state does not occurs due to the connection between the conductive particles 62 in the anisotropic conductive film 60 during the COG-mounting operation, and is, for example, 10 to 20 μm or so. Since the adjacent output-side mounting terminals 5a and 5b have different signals, a gap between the output-side mounting terminal 5a and the output-side mounting terminal 5b adjacent thereto needs to be not less than the minimum gap D. In the case of the minimum gap D, a gap in a direction of the source wiring 3 is indicated by "Y1".

Here, since the same signal is generated between the inspection terminal 6b and the output-side mounting terminal 5b belonging to the same source wiring 3 and having a small terminal gap, the gap may be not more than the minimum gap D. The reason is because a defective product is not produced due to a short-circuit state in the same signal. At this time, a gap in a direction of the source wiring 3 is indicated by "Y2".

Accordingly, in the first embodiment, a terminal-area length P1 obtained by adding the lengths of the output-side mounting terminals 5a and 5b to the lengths of the inspection terminals 6a and 6b is "P1=2(L1+L2+Y1)+Y2".

Figure 5:
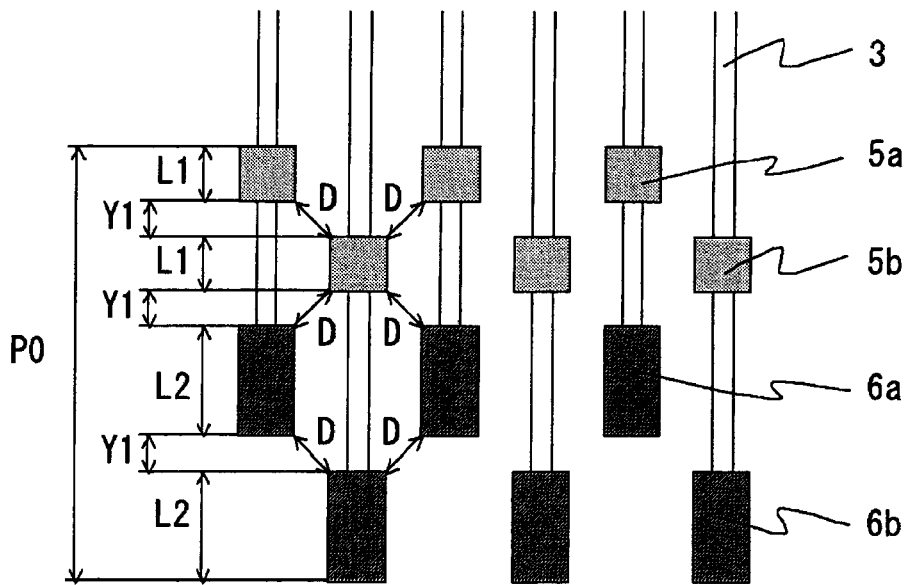
FIG. 5 is a top view further magnifying the output-side mounting terminal and the inspection terminal according to a comparative example of the first embodiment of the invention.

Next, FIG. 5 is a top view showing a comparative example in which the output-side mounting terminals 5a and 5b and the inspection terminals 6a and 6b have the same-direction zigzag arrangements in the terminal-row direction. In the comparative example shown in FIG. 5, since the same-direction zigzag arrangements are set in the terminal-row direction, even when the output-side mounting terminal 5a and the inspection terminal 6a belonging to the same source wiring 3 in a certain row have the same signal, a gap between the output-side mounting terminal 5a and the inspection terminal 6a is limited by the minimum gap D of the adjacent output-side mounting terminal 5b. For the same reason, a gap between the output-side mounting terminal 5b and the inspection terminal 6b in the other adjacent row is limited by the minimum gap D of the adjacent inspection terminal 6a.

Accordingly, in the comparative example in FIG. 5, a terminal-area length P0 in a direction of the source wiring 3 obtained by adding the lengths of the output-side mounting terminals 5a and 5b to the lengths of the inspection terminals 6a and 6b is "P0=2(L1+L2+Y1)+Y1".

As a result, a difference between the terminal-area lengths in a direction of the source wiring 3 shown in FIG. 4 according to the first embodiment and shown in FIG. 5 according to the comparative example is "P1−P0=Y2−Y1". In the first embodiment, since there is no limitation in Y2, the gap may be not more than the length Y1 in a direction of the source wiring 3 in the case of the minimum gap D.

Accordingly, since "Y2−Y1" can be set to a negative value, the terminal-area length P1 in a direction of the source wiring 3 obtained by adding the lengths of the output-side mounting terminals 5a and 5b to the lengths of the inspection terminals 6a and 6b can be set to be smaller than the length P0 in the same-direction zigzag arrangement.

As described above, in the first embodiment, since the inspection terminals 6a and 6b are disposed below the source driving circuit chip 30, it is possible to efficiently use an area below the source driving circuit chip 30. Accordingly, it is possible to cope with the narrow frame width of the frame area 55 and to improve the reliability of the inspection terminals 6a and 6b.

Further, since the output-side mounting terminals 5a and 5b and the inspection terminals 6a and 6b have the opposite-direction zigzag arrangement in the terminal-row direction, a length can be set to be smaller than the length P0 in the same-direction zigzag arrangement, thereby coping with the additional narrow frame width of the width SDW of the source driving circuit chip 30.

Second Embodiment

Figure 6:
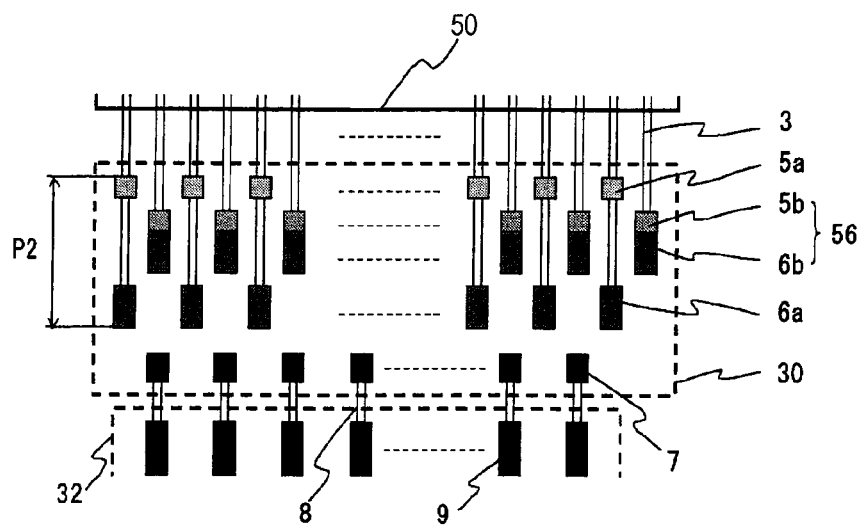
FIG. 6 is a top view magnifying the area of the source driving circuit chip of the display device according to a second embodiment of the invention.
Figure 7:
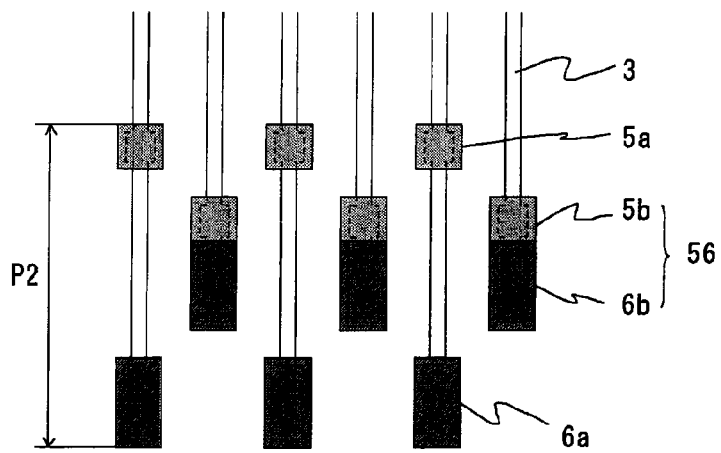
FIG. 7 is a top view further magnifying the output-side mounting terminal and the inspection terminal according to the second embodiment of the invention.

FIG. 6 is a top view magnifying an area of the source driving circuit chip of the display device according to a second embodiment of the invention. FIG. 7 is a top view further magnifying the output-side mounting terminals and the inspection terminals.

In the second embodiment, a gap Y1 between the output-side mounting terminal 5b and the inspection terminal 6b is set to "0", and hence the output-side mounting terminal 5b and the inspection terminal 6b are formed into an integrated terminal 56. Accordingly, it is possible to allow an output-side-terminal-area length P2 to be much smaller than the terminal-area length P1 according to the first embodiment. Also, it is possible to cope with the additional narrow frame width of the width SDW of the source driving circuit chip 30.

In addition, as shown in FIG. 7, in the integrated terminal 56 according to the second embodiment, in order to indicate a boundary between the output-side mounting terminal 5b and the inspection terminal 6b, a width of a lower-layer source wiring 3 connected to the integrated terminal 56 is changed at the boundary. That is, although a width of the source wiring 3 disposed in the lower layer of the integrated terminal 56 is set to be large, a width is set to be small in the boundary between the output-side mounting terminal 5b and the inspection terminal 6b in order to display the boundary.

Alternatively, a part of the width of the integrated terminal 56 may be changed in the boundary between the mounting terminal 5b and the inspection terminal 6b in order to display the boundary. Also, a separate display pattern may be provided in the vicinity of the boundary between the mounting terminal 5b and the inspection terminal 6b.

Likewise, in the case of the integrated terminal 56, since the boundary between the output-side mounting terminal 5b and the inspection terminal 6b is displayed, it is easy to carry out a positioning operation during the display inspection or the COG-mounting operation.

Third Embodiment

Figure 8:
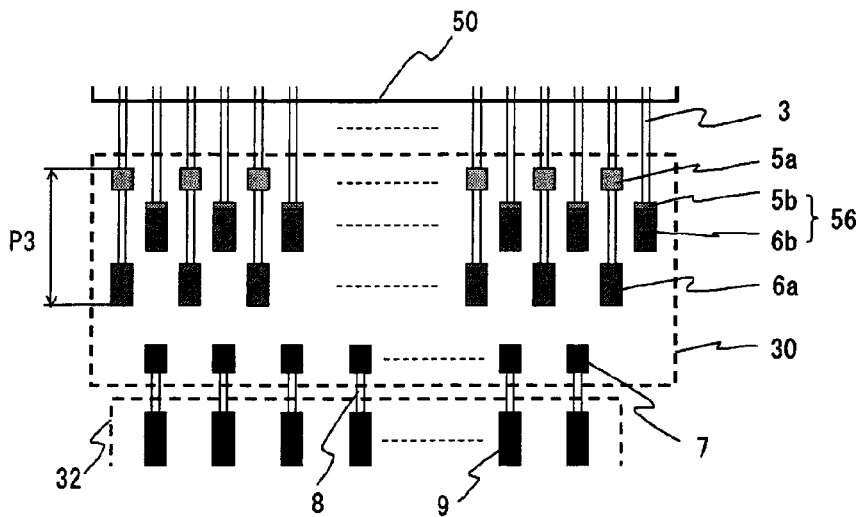
FIG. 8 is a top view further magnifying the area of the source driving circuit chip of the display device according to a third embodiment of the invention.

FIG. 8 is a top view further magnifying the area of the source driving circuit chip of the display device according to a third embodiment of the invention.

In the third embodiment, in the same manner as the second embodiment, the output-side mounting terminal 5b and the inspection terminal 6b are formed into the integrated terminal 56. Also, a length of the integrated terminal 56 is set to be smaller than "L1+L2" obtained by adding a length L1 of the output-side mounting terminal 5a to a length L2 of the inspection terminal 6a. Accordingly, it is possible to allow a terminal-area length P3 to be much smaller than those of the first and second embodiments. Also, it is possible to cope with the additional narrow frame width of the width SDW of the source driving circuit chip 30.

In FIG. 8, the length of the output-side mounting terminal 5b is smaller than that of the output-side mounting terminal 5a, but the length of the inspection terminal 6b may be smaller than that of the inspection terminal 6a. Alternatively, both lengths of the output-side mounting terminal 5b and the inspection terminal 6b may be smaller than that of the output-side mounting terminal 5a and the inspection terminal 6a.

Further, in the third embodiment, since a part of the integrated terminal 56 is used in common during the COG-mounting operation and the display inspection, the integrated terminal 56 can be applied to the case where a scar hardly occurs in the integrated 56 during the display inspection and a yield of the COG-mounting operation of the source driving circuit chip 30 is not influenced.

Fourth Embodiment

Figure 9:
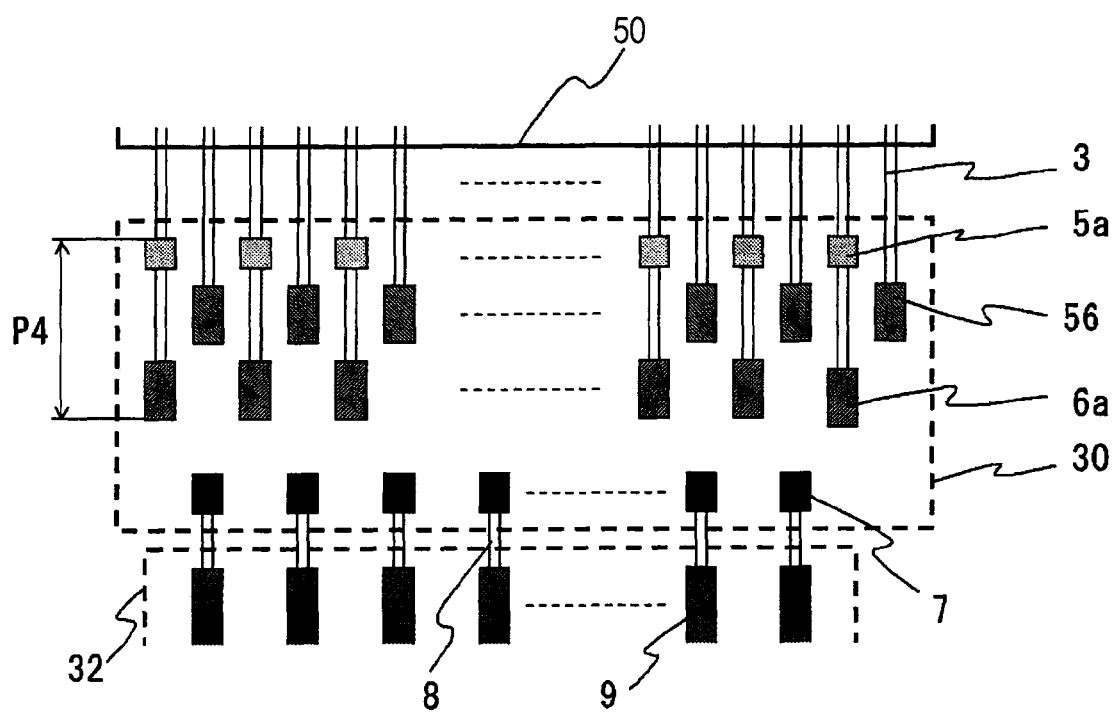
FIG. 9 is a top view magnifying the area of the source driving circuit chip of the display device according to a fourth embodiment of the invention.

FIG. 9 is a top view magnifying the area of the source driving circuit chip of the display device according to a fourth embodiment of the invention.

In the fourth embodiment, the output-side mounting terminal 5b and the inspection terminal 6b are formed into the integrated terminal 56. Also, the length of the integrated terminal 56 is set to be equal to that of the adjacent inspection terminal 6a. In order to carry out the display inspection, the length of the integrated terminal 56 becomes minimized. Accordingly, it is possible to allow an output-side-terminal-area length P4 to be much smaller than those of the first to third embodiments. Also, it is possible to cope with the additional narrow frame width of the width SDW of the source driving circuit chip 30.

Even in the fourth embodiment, since the integrated terminal 56 is used in common during the COG-mounting operation and the display inspection, the integrated terminal 56 can be applied to the case where a scar hardly occurs in the integrated 56 during the display inspection and a yield of the COG-mounting operation of the source driving circuit chip 30 is not influenced.

As described above, in the first to fourth embodiments, the terminal configuration on the side of the source driving circuit chip 30 is described, but the invention can be applied to the gate driving circuit chip 20 by allowing the terminals on the side of the gate driving circuit chip 20 to have the same configuration.

In the first to fourth embodiments, the gate driving circuit chip 20 and the source driving circuit chip 30 are separately provided, but the invention can be applied to the case where the driving circuit chip is obtained by integrally forming the gate driving circuit and the source driving circuit and the driving circuit chip is provided on one side of the frame area 55.

In the first to fourth embodiments, the configuration of the two-row zigzag arrangements of the output-side mounting terminals 5a and 5b and the inspection terminals 6a and 6b is described, but the invention can be applied to the case of a three-row or more zigzag arrangement.

In the first to fourth embodiments, the display device is the liquid crystal device 100, but the invention is not limited thereto. For example, the invention can be applied to the display device which is COG-mounted on the array substrate in an electronic paper using a display medium such as plasma, EL, FED, corpuscle, or oil droplet.

What is claimed is:

1. A display device comprising:
a substrate comprising a display area and a frame area that is provided outside of the display area;
pixels arranged in a matrix shape on the display area of the substrate;
mounting terminals provided in the frame area of the substrate so as to be connected to wirings for driving the pixels; and
a driving circuit chip directly mounted to the mounting terminals on the substrate so as to drive the pixels,
wherein the mounting terminals comprises output-side mounting terminals, which are provided on an output side of the driving circuit chip, and which have plural-row zigzag arrangement,
wherein inspection terminals disposed to respectively correspond to the output-side mounting terminals have a zigzag arrangement opposite to the zigzag arrangement of the output-side mounting terminals in a row direction of the output-side mounting terminals, and
wherein the mounting terminals and the inspection terminals are disposed below the driving circuit chip.

2. The display device according to claim 1,
wherein a gap between each mounting terminal and each inspection terminal of each wiring belonging to one row of the plural-row zigzag arrangement is smaller than a gap between the mounting terminal in the one row and the mounting terminal in the other adjacent row and a gap between the inspection terminal in the one row and the inspection terminal in the other adjacent row.

3. The display device according to claim 1,
wherein the mounting terminal and the inspection terminal of the wiring belonging to the one row of the plural-row zigzag arrangement are formed into an integrated terminal.

4. The display device according to claim 3,
wherein an indication of a boundary between the mounting terminal and the inspection terminal is provided in an area of the integrated terminal.

5. The display device according to claim 3,
wherein a wiring-direction length of the integrated terminal is not less than a wiring-direction length of the inspection terminal of the wiring belonging to the other row, and is not more than a sum of wiring-direction lengths of the mounting terminal and the inspection terminal of the wiring belonging to the other row.

6. The display device according to claim 5,
wherein the wiring-direction length of the integrated terminal is equal to the wiring-direction length of the inspection terminal of the wiring belonging to the other row.

* * * * *